US009097290B2

(12) United States Patent
Luipold et al.

(10) Patent No.: US 9,097,290 B2
(45) Date of Patent: Aug. 4, 2015

(54) FRICTION PLATE INCLUDING CONNECTED CORE PLATES

(71) Applicant: Schaeffler Technologies GmbH & Co. KG, Herzogenaurach (DE)

(72) Inventors: Chris Luipold, Wadsworth, OH (US); Scott Strong, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/263,670

(22) Filed: Apr. 28, 2014

(65) Prior Publication Data
US 2014/0326573 A1 Nov. 6, 2014

Related U.S. Application Data

(60) Provisional application No. 61/817,941, filed on May 1, 2013.

(51) Int. Cl.
*F16D 13/64* (2006.01)
*F16D 69/04* (2006.01)
*F16D 69/00* (2006.01)

(52) U.S. Cl.
CPC .............. *F16D 13/64* (2013.01); *F16D 13/648* (2013.01); *F16D 69/0408* (2013.01); *F16D 2013/642* (2013.01); *F16D 2069/009* (2013.01); *F16D 2069/045* (2013.01); *Y10T 29/49904* (2015.01)

(58) Field of Classification Search
None
See application file for complete search history.

(56) References Cited

U.S. PATENT DOCUMENTS

| 4,741,424 | A | | 5/1988 | Kitano et al. |
| 5,226,516 | A | * | 7/1993 | Novikoff et al. ........... 192/70.28 |
| 5,314,052 | A | | 5/1994 | Henrion |
| 5,337,870 | A | | 8/1994 | Hays |
| 5,720,373 | A | | 2/1998 | Schulz-Andres et al. |
| 2008/0210513 | A1 | * | 9/2008 | Dumas et al. ................. 192/107 |
| 2013/0092499 | A1 | | 4/2013 | Luipold |

FOREIGN PATENT DOCUMENTS

JP 2009-287691 A 12/2009

OTHER PUBLICATIONS

International Search Report and Written Opinion for corresponding International application PCT/US2014/035065.

* cited by examiner

*Primary Examiner* — Rodney H Bonck
*Assistant Examiner* — Timothy M Hannon
(74) *Attorney, Agent, or Firm* — Davidson, Davidson & Kappel, LLC

(57) ABSTRACT

A friction plate for a clutch is provided. The friction plate includes a first core plate including at least one first radial extension, a second core plate including at least one second radial extension and friction material held axially between the at least one first radial extension and the at least one second radial extension. The at least one first radial extension and the at least one second radial extension are imbedded axially into opposite sides of the friction material and joined together. A method of forming a friction plate for a clutch is also provided.

19 Claims, 3 Drawing Sheets

FRICTION PLATE INCLUDING CONNECTED CORE PLATES

This claims the benefit to U.S. Provisional Patent Application No. 61/817,941, filed on May 1, 2013, which is hereby incorporated by reference herein.

The present disclosure relates to friction clutches and friction plates, and more particularly to a wet-type friction clutch with a plurality of friction plates. Such friction clutches may be used for example in motor vehicle transmissions.

BACKGROUND

Friction plates are commonly formed by bonding friction material to a steel core plate with adhesive. The cost of the adhesive and the preparation for the steel core plate are expensive.

U.S. Publication No. 2013/0092499 discloses a method of forming a friction plate without using adhesive.

SUMMARY OF THE INVENTION

A friction plate for a clutch is provided. The friction plate includes a first core plate including at least one first radial extension, a second core plate including at least one second radial extension and friction material held axially between the at least one first radial extension and the at least one second radial extension. The at least one first radial extension and the at least one second radial extension are imbedded axially into opposite sides of the friction material and joined together.

Embodiments of the friction plate may also include one or more of the following advantageous features:

The friction material may protrude axially outside of the at least one first radial extension and the at least one second radial extension. The first core plate may be extruded into the second core plate to connect the first core plate, the second core plate and the friction material to each other. The second core plate may include at least one hole, the first core plate being extruded into the at least one hole. The first core plate may be extruded to form a plurality of rivets, the at least one hole including a plurality of holes, each of the rivets passing into one of the holes. The first core plate may include a first center ring for aligning the first core plate and the at least one first radial extension may protrude radially from the first center ring. The second core plate may include a second center ring for aligning the second core plate. The at least one second radial extension may protrude radially from the second center ring. The first radial extension may be riveted to the at least one second radial extension. The at least one first radial extension may include a plurality of first radial extensions and the at least one second radial extensions may include a plurality of second radial extensions. Each of the first radial extensions may be riveted to one of the second radial extensions. The first and second radial extensions are riveted together near a radial middle region of each first radial extension and a radial middle region of each second radial extension. The at least one first radial extension and the at least one second radial extension may extend circumferentially in opposite directions to form at least one X shaped protrusion.

A clutch including the friction plate is also provided.

A friction plate is also provided that includes a first core plate, a second core plate and friction material. The first core plate and the second core plate are riveted together to fix the friction material, the first core plate and the second core plate together.

A method of forming a friction plate for a clutch is also provided. The method includes providing friction material axially between a first core plate and a second core plate and fixing at least one first radial extension of the first core plate to at least one radial extension of the second core plate to secure the friction material axially between the at least one first radial extension and the at least one second radial extension.

Embodiments of the method may also include one or more of the following advantageous features:

The fixing the first core plate to the second core plate may include extruding the at least one first radial extension axially into the at least one second radial extension. The at least one first radial extension may include a plurality of first radial extensions and the at least one second radial extension may include a plurality of second radial extensions. The extruding may include extruding each of the first radial extensions into one of the second radial extensions. The fixing the first core plate to the second core plate may include riveting the at least one first radial extension to the at least one second radial extension.

BRIEF DESCRIPTION OF THE DRAWINGS

The present invention is described below by reference to the following drawings, in which:

FIG. 2b shows a section view along A-A of FIG. 2a; and

FIG. 3 shows schematically a friction clutch with a plurality of the friction plates shown in FIG. 2a.

DETAILED DESCRIPTION

Figure 1:
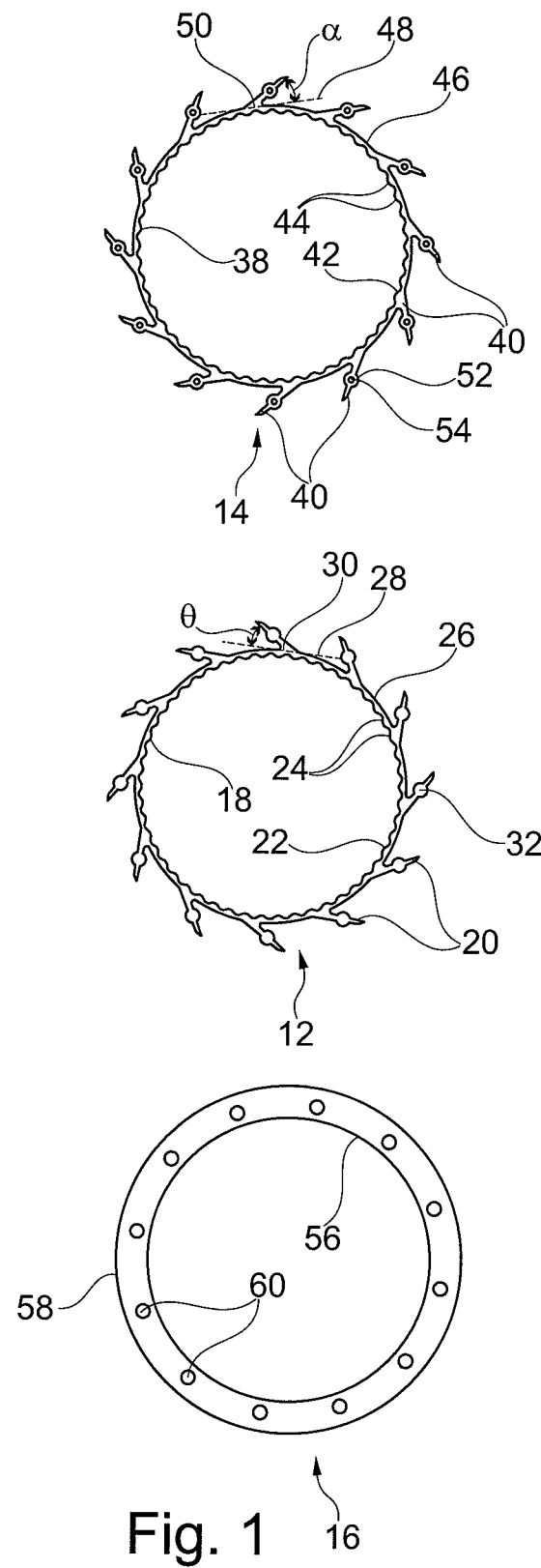
FIG. 1 shows a first core plate, a second core plate and a friction material ring for forming a friction plate in accordance with an embodiment of the present invention.

FIG. 1 shows a first core plate 12, a second core plate 14 and a friction material ring 16 for forming a friction plate 10, as shown in FIG. 2. In this embodiment, first core plate 12 includes a first center ring 18 and a plurality of first radial extensions 20 extending radially away from first center ring 18. Center ring 18 includes a splined inner circumferential surface 22 having a plurality of teeth 24 for aligning first core plate 12 by meshing with teeth of an inner clutch carrier 150 (FIG. 3). First radial extensions 20 protrude radially away from an outer circumferential surface 26 of center ring 18, while also extending circumferentially. In this embodiment, extensions 20 extend circumferentially such that each extension 20 forms an angle $\theta$ with a respective tangent line 28 passing through a center 30 of the respective extension 20 at the outer circumference of center ring 18. In this embodiment, angle $\theta$ is approximately 45°, although in other embodiments, angle $\theta$ may be greater or less than 45°. Each first radial extension 20 includes an enlarged portion or connecting pad 32, which in this embodiment is shaped as a circle, in the approximate middle thereof for connecting first core plate 12 to second core plate 14.

Similar to first core plate 12, second core plate 14 includes a second center ring 38 and a plurality of second radial extensions 40 extending radially away from second center ring 38. Center ring 38 includes a splined inner circumferential surface 42 having a plurality of teeth 44 for aligning second core plate 14 by meshing with teeth of inner clutch carrier 150 (FIG. 3). Second radial extensions 40 protrude radially away from an outer circumferential surface 46 of center ring 38, while also extending circumferentially. In this embodiment, extensions 40 extend circumferentially such that each extension 40 forms an angle a with a respective tangent line 48 passing through a center 50 of the respective extension 40 at the outer circumference of center ring 38. In this embodiment, angle a is equal to angle θ and is approximately 45°. In other embodiments, angle a may be greater or less than 45° and angle a may be different that angle θ. Each first radial extension 40 includes an enlarged portion or connecting pad 52, which in this embodiment is shaped as a circle, in the approximate middle thereof for aligning with a corresponding one of enlarged portions 32 of extensions 20 for connecting second core plate 14 to first core plate 12. Each enlarged portion 52 includes a hole 54 passing axially therethrough.

Friction material ring 16 includes an inner circumferential surface 56 sized to align with outer circumferential surfaces 26, 46 and includes an outer circumferential surface 58 sized to align with the outer circumferential surfaces of extensions 20, 40. Friction material ring 16 also has a plurality of holes 60 passing therethrough that are arranged to align with enlarged portions 32, 52.

Figure 2A:
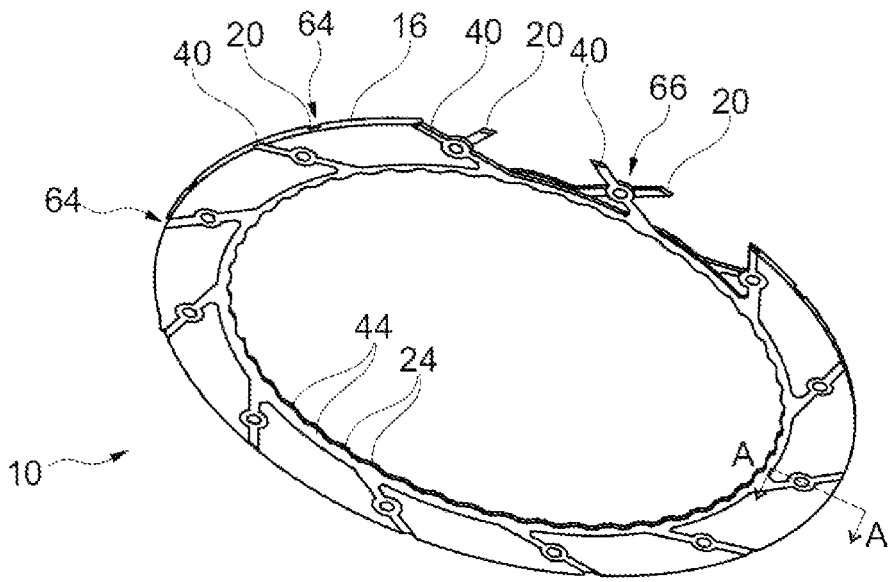
FIG. 2a shows a friction plate in accordance with an embodiment of the present invention.
Figure 3:
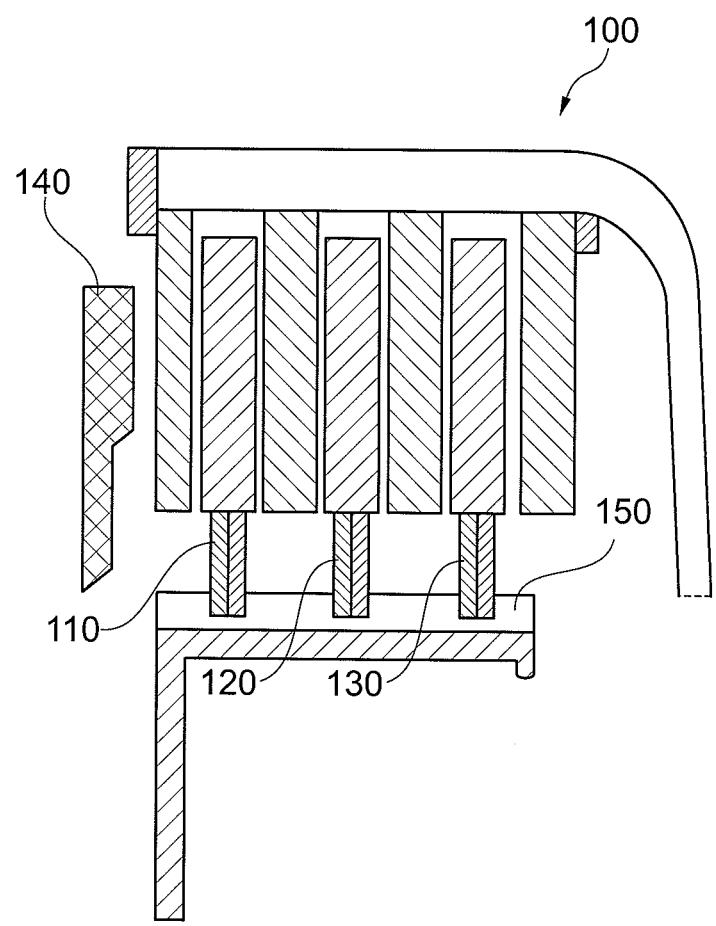

FIG. 2a shows a friction plate 10 according to an embodiment of the present invention, with a circumferential portion of friction plate 10 being removed to show a portion of first core plate 12. Friction plate 10 includes first core plate 12, second core plate 14 and friction material ring 16 joined together by rivets 62 formed by extruding first radial extensions 20 into second radial extensions 40. As shown in FIG. 2a, radial extensions 20, 40 have been pressed axially into opposite sides of friction material ring 16 and are imbedded into friction material ring 16. In a preferred embodiment, rings 12, 14 are each 0.4 mm thick, friction material ring 16 is a single piece that is 1.6 mm thick and rings 12, 14 are each pressed into friction material ring 16 approximately 0.8 mm, such that friction material 16 protrudes axially outside of core plate 12 on one side by approximately 0.4 mm and protrudes axially outside of core plate 14 on one side by approximately 0.4 mm. The imbedding of extensions 20, 40 into friction material forms a plurality of grooves 64 on the surfaces of both sides of friction plate 10 for fluid flow when used in a wet-type friction clutch. In this embodiment, core plates 12, 14 are made from metal, preferably stamped steel. Because extensions 20, 40 form part of grooves 64, core plates 12, 14 are an active part of the cooling circuit for the wet-type friction clutch, acting as a heat sink for the fluid of the wet-type friction clutch. Extensions 20, 40 transit torque from friction material ring 16 via center rings 18, 38 to clutch inner carrier 150 (FIG. 3).

Figure 2B:
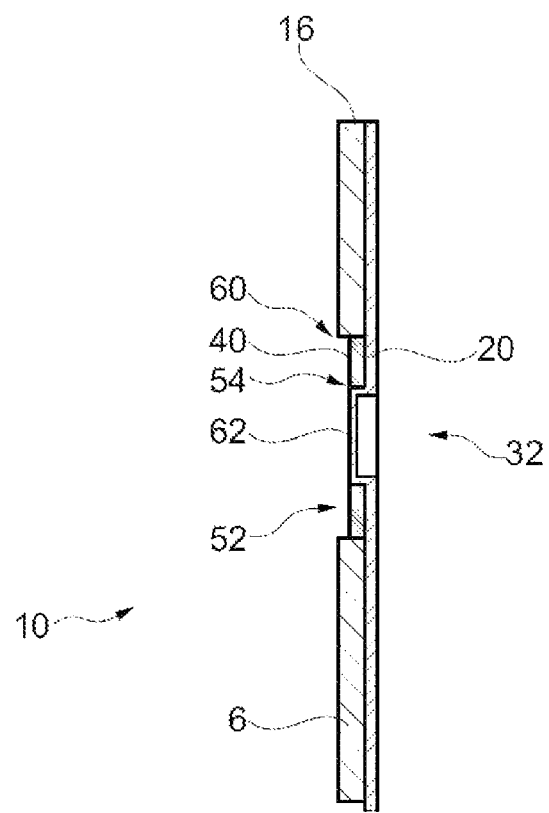

FIG. 2b shows a view along A-A of FIG. 2a, which follows the center of one of extensions 20. As shown in FIG. 2b, enlarged portion or connecting pad 32 of extension 20 and pad 52 of extension 40 are aligned with each other at hole 60 in friction material ring 16 and enlarged portion 32 has been extruded into hole 54 with such force that a rivet 62 is formed, joining extension 20 and extension 40. Holes 60 in friction material ring 16 allow enlarged portions 32 to contact enlarged portions 52 and provide for sufficient space for extensions 20 to be extruded into holes 54 in extensions 40. In a preferred embodiment, hole 54 in extension 40 is used as a die block for extrusion of extension 20. A punch having a diameter smaller than hole 54 may be used to extrude a portion of extension 20 into hole 54 in extension 40. As the portion of extension 20 is extruded into hole 54, a bottom half of a die used to cure friction material ring 16 may be used to prevent the punch from extruding axially past extension 40. By preventing the extrusion axially past extension 40, the punched portion of extension 20 expands radially, locking extensions 20, 40 together.

Accordingly, the method of forming friction plate 10 according to an embodiment of the present invention may include providing friction material ring 16 axially between first core plate 12 and second core plate 14. First core plate 12 and second core plate 14 are aligned with respect to each other such that teeth 24 and teeth 44 are aligned with each other and such that each connecting pad 32 is aligned with one of connecting pads 52. Also, friction material ring 16 is aligned with respect to core plates 12, 14 such that pads 32 contact pads 52 inside of holes 60 in friction material ring. As shown in FIG. 2a, as aligned, extensions 20 of first core plate 12 extend in the opposite circumferential direction as extensions 40 of second core plate 12. Because of this, when connecting pads 32 and connecting pads 52 are aligned with each other, extension 20, 40 form X shaped protrusions 66 from center rings 18, 38. Friction material ring 16 is provided on core plates 12, 14 such that inner circumferential surface 56 of friction material ring 16 is aligned with outer circumferential surfaces 26, 46 of center rings 18, 30 and outer circumferential surface 58 of friction material ring 16 is aligned with the outer circumferential surfaces of extensions 20, 40.

Once first core plate 12, second core plate 14 and friction material ring 16 are appropriately aligned with each other, first radial extensions 20 of first core plate 12 are fixed to second radial extensions 40 of second core plate 14 to secure friction material ring 16 axially between first radial extensions 20 and second radial extensions 40. In a preferred embodiment, extensions 20, 40 are fixed together using the extruding mentioned above to rivet extensions 20, 40 to each other. In other embodiments, extensions may be fixed together by spot welds or an interference fit may be induced between core plates 12, 14.

FIG. 3 shows schematically a wet-type friction clutch 100 of a motor vehicle transmission having a plurality of friction plates 110, 120, 130, with friction plates 110, 120, 130 being similar to friction plate 10 as shown in FIG. 2a for example. The axially-movable plates 110, 120, 130 can be pressed against axially-movable separator plates by a piston 140, for example a hydraulically-actuated piston, to provide frictional engagement. Friction plates 110, 120, 130 may be aligned on inner clutch carrier 150 by teeth similar to teeth 24, 44 described above.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A friction plate for a clutch comprising:
   a first core plate including at least one first radial extension;
   a second core plate including at least one second radial extension; and
   friction material held axially between the at least one first radial extension and the at least one second radial extension, the at least one first radial extension and the at least one second radial extension imbedded axially into opposite sides of the friction material and joined together.

2. The friction plate as recited in claim 1 wherein the friction material protrudes axially outside of the at least one first radial extension and the at least one second radial extension.

3. The friction plate as recited in claim 1 wherein the first core plate is extruded into the second core plate to connect the first core plate, the second core plate and the friction material to each other.

4. The friction plate as recited in claim 3 wherein the second core plate includes at least one hole, the first core plate being extruded into the at least one hole.

5. The friction plate as recited in claim 4 wherein the first core plate is extruded to form a plurality of rivets, the at least one hole being a plurality of holes, each of the rivets passing into one of the holes.

6. The friction plate as recited in claim 1 wherein the first core plate includes a first center ring for aligning the first core plate and the at least one first radial extension protrudes radially from the first center ring, the second core plate including a second center ring for aligning the second core plate, the at least one second radial extension protruding radially from the second center ring.

7. The friction plate as recited in claim 1 wherein the at least one first radial extension is riveted to the at least one second radial extension.

8. The friction plate as recited in claim 7 wherein the at least one first radial extension is a plurality of first radial extensions and the at least one second radial extensions is a plurality of second radial extensions, each of the first radial extensions being riveted to one of the second radial extensions.

9. The friction plate as recited in claim 8 wherein the first and second radial extensions are riveted together near a radial middle region of each first radial extension and a radial middle region of each second radial extension.

10. The friction plate as recited in claim 1 wherein the at least one first radial extension and the at least one second radial extension extend circumferentially in opposite directions to form at least one X shaped protrusion.

11. A wet-type friction clutch comprising:
at least one friction plate as recited in claim 1.

12. A friction plate comprising:
a first core plate;
a second core plate; and
friction material, the first core plate and the second core plate being riveted together to fix the friction material, the first core plate and the second core plate together, the friction material being sandwiched between first radial extensions of the first core plate and second radial extension of the second core plate.

13. The friction plate as recited in claim 12 wherein the first radial extensions and the second radial extensions are pressed into the friction material such that the friction material extends axially past the first radial extensions and the second radial extensions.

14. The friction plate as recited in claim 12 wherein the first core plate and the second core plate are riveted together at the first and second extensions.

15. The friction plate as recited in claim 14 wherein each of the first extensions is extruded into one of the second extensions to rivet the first core plate and the second core plate together.

16. A method of forming a friction plate for a clutch comprising:
providing friction material axially between a first core plate and a second core plate; and
fixing at least one first radial extension of the first core plate to at least one radial extension of the second core plate to secure the friction material axially between the at least one first radial extension and the at least one second radial extension.

17. The method as recited in claim 16 wherein the fixing the first core plate to the second core plate includes extruding the at least one first radial extension axially into the at least one second radial extension.

18. The method as recited in claim 17 wherein the at least one first radial extension is a plurality of first radial extensions and the at least one second radial extension is a plurality of second radial extensions, the extruding including extruding each of the first radial extensions into one of the second radial extensions.

19. The method as recited in claim 16 wherein the fixing the first core plate to the second core plate includes riveting the at least one first radial extension to the at least one second radial extension.

* * * * *